(12) United States Patent
Fossati et al.

(10) Patent No.: US 10,502,834 B2
(45) Date of Patent: Dec. 10, 2019

(54) METHOD AND DEVICE FOR DETECTING THE FORM OF SAILS

(71) Applicants: POLITECNICO DI MILANO, Milan (IT); FONDAZIONE CARIPLO, Milan (IT)

(72) Inventors: Fabio Fossati, Milan (IT); Remo Sala, Milan (IT); Ambra Vandone, Milan (IT); Giacomo Mainetti, Milan (IT)

(73) Assignee: POLITECNICO DI MILANO, Milan (IT)

( * ) Notice: Subject to any disclaimer, the term of this patent is extended or adjusted under 35 U.S.C. 154(b) by 101 days.

(21) Appl. No.: 15/515,237

(22) PCT Filed: Sep. 28, 2015

(86) PCT No.: PCT/EP2015/072278
§ 371 (c)(1),
(2) Date: Mar. 29, 2017

(87) PCT Pub. No.: WO2016/050701
PCT Pub. Date: Apr. 7, 2016

(65) Prior Publication Data
US 2017/0219712 A1 Aug. 3, 2017

(30) Foreign Application Priority Data
Sep. 29, 2014 (IT) ............... PD2014A0249

(51) Int. Cl.
*G01S 17/89* (2006.01)
*B63H 9/04* (2006.01)
(Continued)

(52) U.S. Cl.
CPC ............... *G01S 17/89* (2013.01); *B63H 9/04* (2013.01); *G01B 11/24* (2013.01); *G01S 7/4817* (2013.01); *G01S 17/42* (2013.01)

(58) Field of Classification Search
CPC ........ G01S 17/00; G01S 17/02; G01S 17/026; G01S 17/06; G01S 17/08; G01S 17/42;
(Continued)

(56) References Cited

U.S. PATENT DOCUMENTS 6,330,523 B1 12/2001 Kacyra et al.
6,420,698 B1 * 7/2002 Dimsdale .............. G01S 7/4811
250/205
(Continued)

FOREIGN PATENT DOCUMENTS

DE 102009018464 A1 11/2010
EP 2728306 A1 5/2014
(Continued)

OTHER PUBLICATIONS

Le Pelley, David et al., "Aerodynamic Force Reduction on Yacht Sails Using Pressure and Shape Measurements in Real Time," 2012, 4th High Performance Yacht Design Conference, Auckland, pp. 1-10.*
(Continued)

*Primary Examiner* — Gordon J Stock, Jr.
(74) *Attorney, Agent, or Firm* — Greer, Burns & Crain, Ltd.; Gregory P. Einhorn

(57) ABSTRACT

A method for detecting the form of sails and the like wherein in the form detection is brought about by means of a three-dimensional measurement of a plurality of locations of the surface of the sail, which measurement is carried out by means of measurement of the time-of-flight of an optical signal.

24 Claims, 4 Drawing Sheets

(51) Int. Cl.
*G01B 11/24* (2006.01)
*G01S 17/42* (2006.01)
*G01S 7/481* (2006.01)

(58) Field of Classification Search
CPC .......... G01S 17/46; G01S 17/47; G01S 17/50; G01S 17/66; G01S 17/74; G01S 17/88; G01S 17/89; G01S 7/4817; B63H 9/04; G01B 11/002; G01B 11/005; G01B 11/24; G01B 11/2408; G01B 11/30; G01B 11/303; G01B 11/306
See application file for complete search history.

(56) References Cited

U.S. PATENT DOCUMENTS

| | | | |
|---|---|---|---|
| 2002/0143506 A1* | 10/2002 | D'Aligny | G01B 11/002 703/6 |
| 2011/0001957 A1* | 1/2011 | Braune | G01B 11/00 356/4.01 |
| 2014/0078519 A1* | 3/2014 | Steffey | G01S 7/4817 356/625 |
| 2014/0151535 A1* | 6/2014 | Mori | G01S 17/42 250/214.1 |

FOREIGN PATENT DOCUMENTS

| | | |
|---|---|---|
| GB | 2400171 A | 10/2004 |
| JP | 2002031516 A | 5/2008 |
| WO | 2001/22033 A1 | 3/2001 |
| WO | 2008/062392 A2 | 5/2008 |

OTHER PUBLICATIONS

Deparday, Julien et al., "Full-scale flying shape measurement of offwind yacht sails with photogrammetry," 2016, Ocean Engineering 127, pp. 135-143.*

Janowski, Artur et al., "The Method of Measuring the Membrane Cover Geometry Using Laser Scanning and Synchronous Photogrammetry," 2015, Photogrammetry and Remote Sensing, 15th International Multidisciplinary Scientific GeoConference SGEM 2015, pp. 1-11.*

V. Diaz-Casas et al., "Artificial Neural Network Correction for Downwind Sail Simulations Based on Experimental Results," 2009, IEEE International Workshop on Intelligent Data Acquisition and Advanced Computing Systems: Technology and Applications, pp. 273-277.*

San Jose Alonso, J.I. et al., "Comparing Time-of-Flight and Phase-Shift. The Survey of The Royal Pantheon in The Basilica of San Isidoro (Leon)," 2011, Inernational Archives of the Photogrammetry, Remote Sensing and Spatial Information Sciences, vol. XXXVIII-5/W16, pp. 377-385.*

Salauen, Marion, et al., "Notificiation of Transmittal of the International Search Report and The Written Opinion of the International Searching Authority, or the Declaration", Patent Cooperation Treaty No. PCT/EP2015/072278, European Patent Office as International Searching Authority, International Search Report Completed Dec. 2, 2015, International Search Report dated Dec. 11, 2015, 12 pages.

* cited by examiner

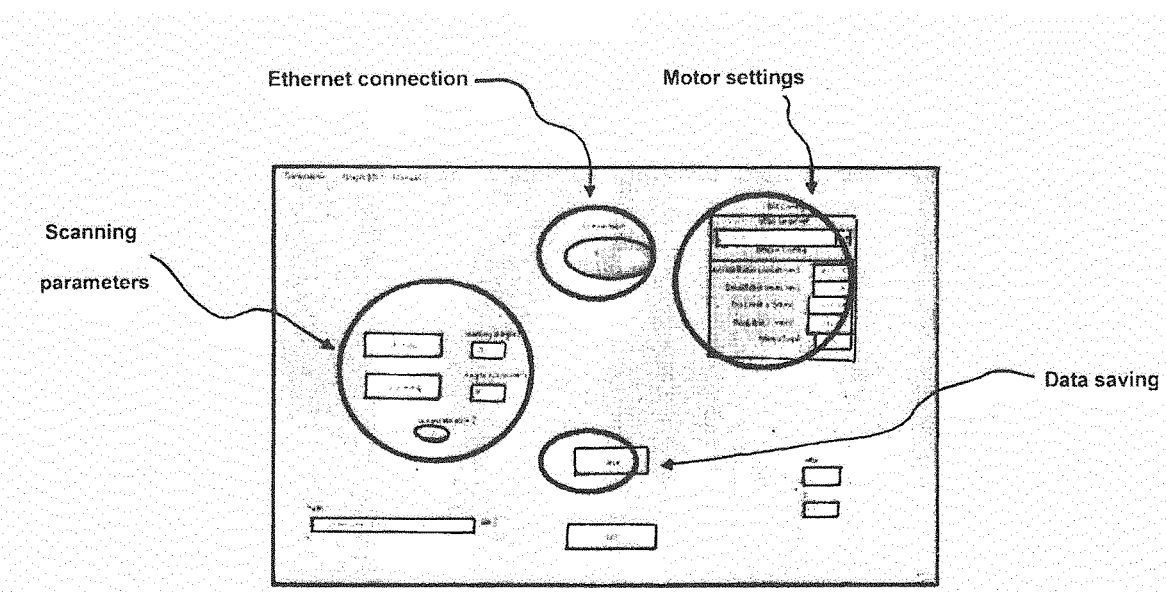
FIG.3
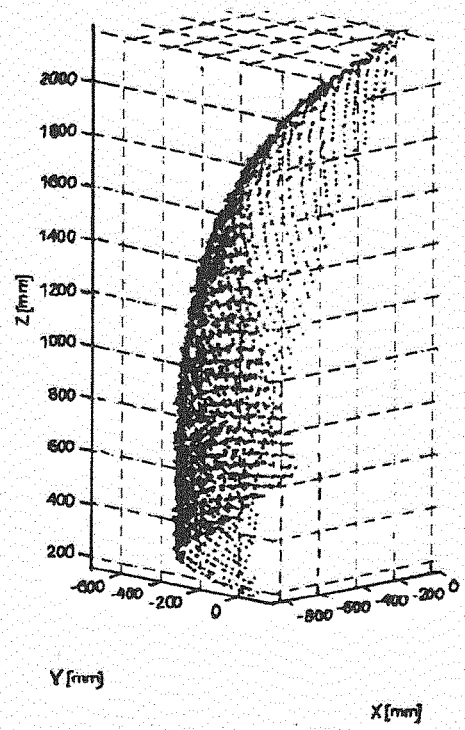 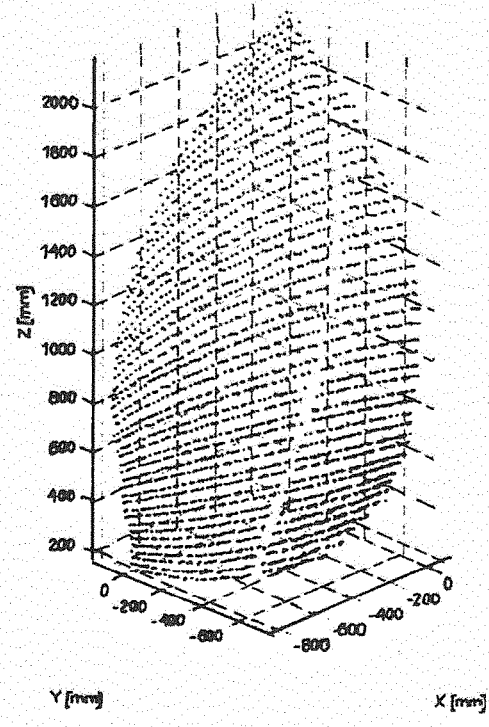
FIG.4 FIG.5

METHOD AND DEVICE FOR DETECTING THE FORM OF SAILS

RELATED APPLICATIONS

This application is a national phase of International patent application number PCT/EP2015/072278, filed Sep. 28, 2015, which claims benefit of priority to Italian patent application number PD2014A000249, filed Sep. 29, 2014.

TECHNICAL FIELD

The present invention concerns a method and a device used in the said method for detecting the form of sails and the like while the said sails and the like are hoisted and subjected to the action of the wind during sailing.

BACKGROUND

A sail is essentially a flexible surface capable of assuming, when exposed to a fluid flow, and more particularly to wind flow, a form capable of generating a propulsive force; generally, the sail assumes in the wind a wing-shaped form that generates lift.

For this reason, when designing, producing and using a sail (or indeed a set of sails interacting with each other) it is extremely important to anticipate and analyse the behaviour of the effective form of the sail once exposed to the wind flow in order to optimise its structure, its profiles, its adjustments and, more generally, its form.

In Anglo-Saxon terminology, the terms "flying shape" and "design shape" are used to distinguish the real form of the sail when hoisted and exposed to the wind from the geometric form conceived by the sailmaker and/or designer. It is evident that the flying shape may diverge more or less markedly from the design shape due to the inevitable approximations of the design, the adjustments to which the sail is subjected, the materials used and the real wind conditions.

Detection of the real form of the sail is a technique adopted in relatively recent times in order to attempt to improve the design of the sail and the adjustments to which it is subjected, with the aim of maximising its efficiency.

To this end, various methods and devices have been developed, generally based on imaging systems using photographic or video cameras that collect images of the sail for subsequent processing of their content. One of the more successful systems is known as VSPARS, developed with the support of the Yacht Research Unit of the University of Auckland in New Zealand. This is based on photographic exposures made from the foot of the sail in action; the sail is provided with "shape lines" consisting of coloured stripes contrasting with the background of the sail, applied to its surface in significant areas, generally spaced at intervals along the vertical profile of the sail. This technique has proved effective, but is subject to certain limits; in particular due to the fact that the entire form of the sail is not processed, but only that of the shape lines. The rest of the information relating to the entire surface of the sail is obtained by processing the recorded data.

SUMMARY

The invention proposes to overcome this disadvantage by offering a method and a device for the implementation of the said method for detecting the form of sails and the like while the said sails and the like are subjected to the action of the wind, both on scale models in wind tunnels and on "full-size" sails and vessels in real conditions of use.

The solution offered by the invention is based on the technology known as "time of flight" (or acronymically as "TOF"), preferably using a multi-echo laser scanner, for example having 5 or more echoes. This type of scanner offers high performance even in severe meteorological conditions, in the presence of rain, fog and dust, by facilitating the acquisition of measurements untroubled by external disturbances.

The scanner is arranged to emit a laser impulse in a determined direction, the said impulse being deflected by a rotating mirror activating the acquisition of measurement of the points concerned, for example with a regular angular pitch adjustable between a minimum of 0.167° and a maximum of 1°. Its working range is from 0.5 m to approximately 80 m, covering an angular sector of 190° from −5° to 185°. These parameters can be varied according to the dimensions of the sail, for example the angular sector can also be reduced.

The TOF laser scanner used supplies information about the measured points in terms of polar coordinates. In particular it supplies, for each measured point, a radius R and an angle ALPHA relating to the origin of the coordinates system on the axis of rotation of the rotating mirror inside the scanner.

Due to its intrinsic characteristics, the laser scanner is suitable for measuring only outstanding points on a single plane, whereas in order to detect the three-dimensional form of a sail it is necessary for the entire surface of the sail to be measured. This result has been obtained by putting the laser scanner into controlled rotation about an axis perpendicular to the axis of rotation of the internal mirror by means of a controlled rotating actuator. Examples of this actuator are a brushless motor and an epicycloidal gear reduction unit (hereinafter brushless gear motor, DC or AC motor, harmonic gear reduction unit or other known equivalent means).

A proximity transducer sensitive to the angular position of the scanner in relation to its axis of rotation is used to identify the initial scanning position for each acquisition of data.

The controlled rotating actuator, i.e. a brushless motor, is controlled by means of a computer program via serial port, and the acquisition of data is managed via an Ethernet connection through a user interface of the scanner. The measured data are received via the TCP/IP protocol and saved in a mass storage device (hard disk) of the computer, generating a cloud of locations (points) whose 3D coordinates are measured in a single absolute reference for each individual point. The cloud of locations describes the three-dimensional shape of the sail in the conditions of use corresponding to the detection of the data. This cloud is transformed into a three-dimensional surface by means of a computer program. The three-dimensional coordinates of each point on the surface identified as belonging to the surface of the sail are stored in a suitable format, for example IGES format.

For defining the surface of the sail, a post-process program is used which automatically plots the angles and edges of the sail. Elimination criteria are applied to remove insignificant points from the cloud and, for each shape acquisition, a dimensional comparison of each side of the sail is performed by comparing the values measured for the base, luff and leech (or foot and drops) with the theoretical reference values for the same sail parts. The program automatically defines and plots a pre-established number (in the case under examination, eight) of sail sections at different heights of the sail and, for each section or stripe of the sail thus identified, performs an automatic analysis consistent with the standard analysis procedure adopted by the designer of the sail, typically supplying for each stripe the entry and exit angles, camber, sheet measurement, depth and location of draft, twist, etc. relative to the central axis of the boat.

In summary, the real surface is compared with a design surface of the said sail in order to adjust the said sail via a comparison between the real surface and the theoretical design surface.

As an alternative to the use of a scanner with a rotating mirror, provision is made for the use of one or more 3D cameras. In a preferred embodiment, the camera or cameras is or are of the time-of-flight type. In this case, since in the case of the preferred embodiment with time-of-flight (TOF) camera or cameras the camera or cameras frame the volume contained between the vertices of the sail, the said camera or cameras extracts or extract the cloud of points in a static manner. Therefore, there is no necessity for moving the scanner via a gear motor and keeping it fixed in the mounting position.

The invention also concerns a device for detecting the form of sails and the like, comprising an optical detection device comprising one or more 3D cameras, particularly of the time-of-flight type, which frame the vertices of the sail.

The characteristics and advantages of the invention will made clearer by the detailed description that follows of a preferred but non-exclusive example of embodiment, illustrated by way of non-limitative indication, with reference to the annexed drawings, in which:

DESCRIPTION OF DRAWINGS

FIG. 3 is a screenshot of the interface software of the device of the present invention;

FIGS. 4 and 5 depict the clouds of points obtained with the device of the present invention; the measurement relates to a hoisted gennaker sail with medium-to-light winds;

DETAILED DESCRIPTION

Figure 1:
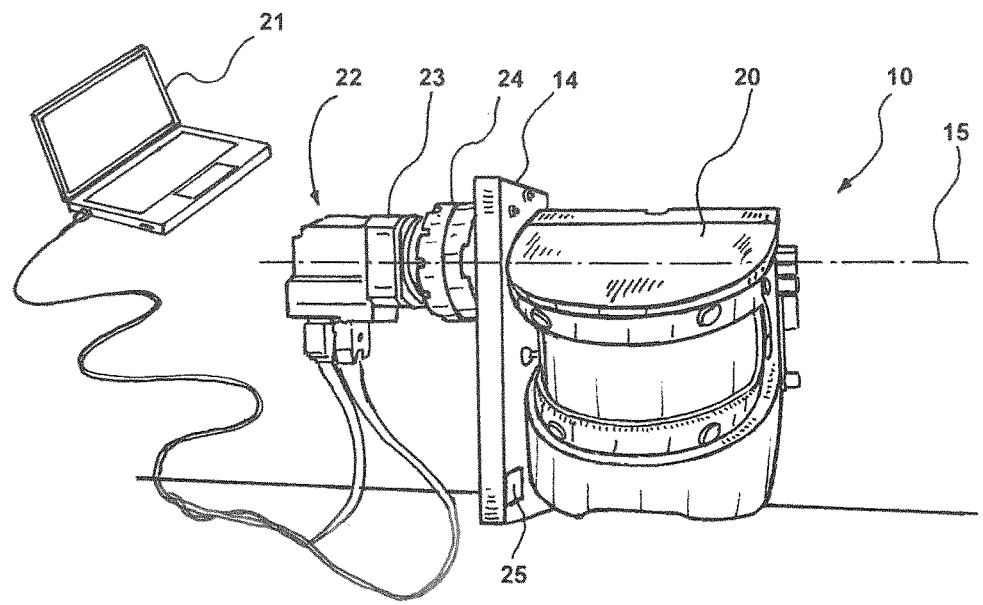
FIG. 1 is a schematic diagram depicting the device of the present invention.
Figure 2:
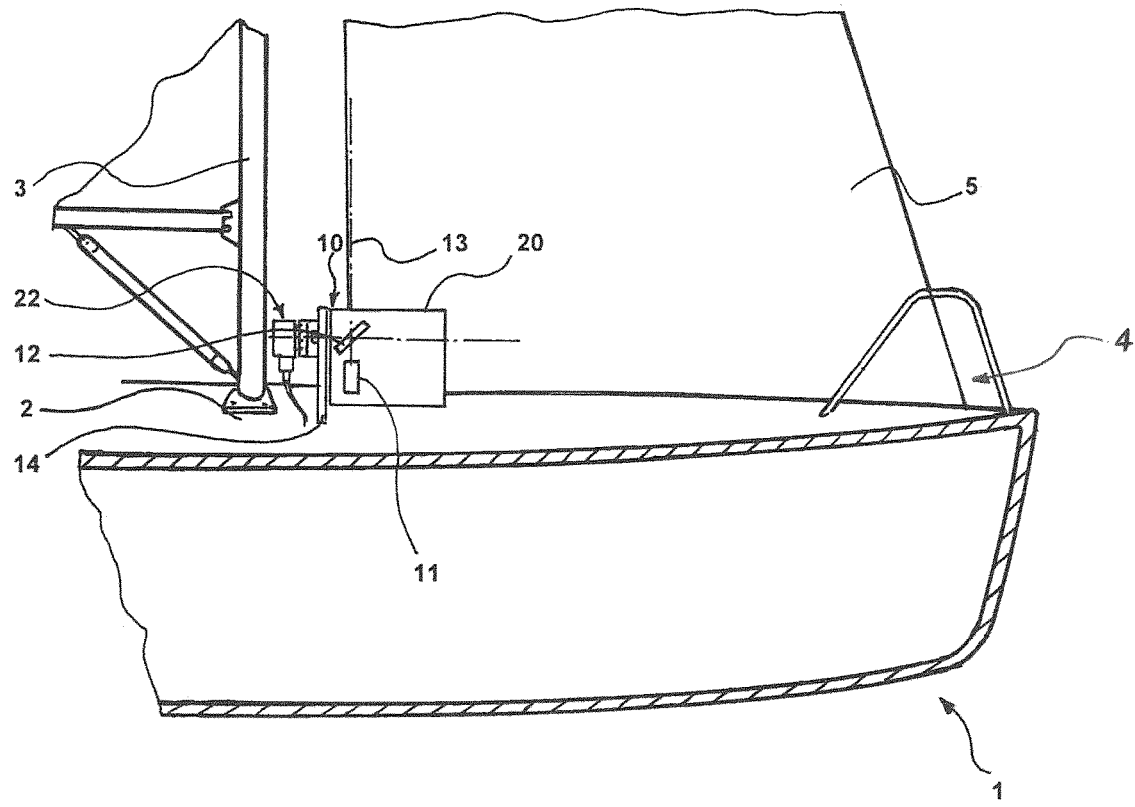
FIG. 2 is a schematic cross-section view of the shape-detecting device of the present invention installed on a boat for detecting the headsails.

Provided are methods and devices for the implementation of a method for detecting the form of sails and the like while the said sails and the like are subjected to the action of the wind, both on scale models in wind tunnels and on "full-size" sails and vessels in real conditions of use.

In the figures, 2 indicates the deck of a sailboat 1 (only partially represented) provided with a mast 3 and related rigging 4 to support one or more sails 5. The drawings show by way of example the presence of a single headsail for relatively wide tacks, for example a gennaker suitable for tacks between 60° and 140° of apparent wind. It is understood that the said system can conveniently be used without substantial modifications for detecting staysails or trysails, such as genoas, mainsails and the like.

The system of the present invention includes one or more time-of-flight optical detection devices 10 for detecting the form of the sail 5, fitted close to the deck 2 in such a position as to be capable of "illuminating" the surface of the sail to be measured. The term "illuminate" is here understood to mean that the generated laser impulse, or more generally the optical signal, progressively hits every point of the sail. Alternatively, if a time-of-flight camera is used, it will be possible to illuminate the surface of the sail if the optical signal generated by the camera is capable of simultaneously hitting every point of the sail.

For a headsail, the device 10 can conveniently be mounted close to the mast 3, whereas for a mainsail or main topsail the device 10 will preferably be placed further back towards the stern of the boat 1. If necessary, two separate devices 10 can be used to detect the two opposing surfaces of a given sail according to the wind direction and the consequent disposition of the said sail with respect to the boat. The use of a single device 10 will be described below, on the understanding that the use of multiple devices 10 is also contemplated by the present invention.

According to a preferred embodiment, the time-of-flight optical detection device 10 comprises a time-of-flight (TOF) laser scanner 20 commercially available as such. In the experimental testing of the invention, a laser scanner with 5-echo technology was used, for example a LMS511-20100 PRO laser scanner made by the German company SICK AG. This type of scanner offers high performance for external use even in severe meteorological conditions, in the presence of rain, fog and dust.

The scanner comprises, in a manner known per se, a laser impulse generator 11 and a mirror 12 rotating about an axis 13, generally coincident with the optical axis of the laser ray, in such a way as to emit a laser impulse in a determined direction, the said impulse being deflected by the rotating mirror activating the acquisition of measurement of the points concerned, with a regular angular pitch adjustable between a minimum of 0.167° and a maximum of 1°. Its working range is from 0.5 m to approximately 80 m, covering a maximum angular sector of 190° from −5° to 185°. The angular sector can be adjusted by reducing it through software.

The TOF laser scanner used supplies information about the measured points in terms of polar coordinates. In particular it supplies, for each measured point, a radius R and an angle ALPHA relating to the origin of the coordinates system on the axis of rotation of the rotating mirror inside the scanner.

The laser scanner is supported on a bracket 14 rotatable about an axis 15 perpendicular to the axis of rotation 13 of the mirror 12. The rotation of the laser scanner is controlled by means of a computer program installed for example on a PC 21 which controls a motorization unit 22 including a brushless motor 23 and an epicycloidal gear reduction unit 24. The angle of rotation about the axis 15 is adjusted according to the dimensions of the sail and the position of the scanner, and is such as to illuminate the entire surface of the sail over a time interval in the order of a few seconds, starting from an initial scanning position that is determined, for each acquisition of data, by a proximity transducer 25 mounted on the bracket 14 and sensitive to the angular position of the scanner.

As mentioned previously, where one or more time-of-flight cameras are used, this or these can be fixed to the bracket rigidly, i.e. without the ability to rotate with respect to the bracket, if the camera or cameras is or are capable of framing the vertices of the sail in such a way as to allow complete detection of its surface.

The acquisition of data is managed via an Ethernet connection through a user interface. A typical screenshot of this interface is depicted in FIG. 3, showing the presence of a series of menus and buttons that make it possible both to configure the device and to activate the scanning and the rotation of the laser scanner as described above.

Preferably, through the graphical interface developed for the data acquisition software, the user can:

Configure the motorization unit used from among those available in the menu a drop-down menu, and in particular select the motor with all its main characteristics;

Configure the serial connection with the motorization unit;

Set the scanning parameters, and in particular the selection of the field to be measured, by setting the scan starting angle and the consequent positioning of the device and the definition of the angular sector that is desired to be measured (angle scanned), as well as the relative movement of the device;

Set the target folder for the file containing the measured data and save the said file.

The measured data are received via the TCP/IP protocol, the connection of which is activated by means of a suitable key present in the interface of FIG. 3, and are saved in a mass storage device (hard disk) of the computer, generating a cloud of locations whose 3D coordinates are measured in an absolute reference for each individual point.

An example of this cloud of points relating to the form acquisition of a gennaker is shown in FIGS. 4 and 5.

The cloud of points describes the three-dimensional form of the sale in the conditions of use corresponding to the detection of the data. This cloud is transformed into a three-dimensional surface by means of a computer program. The three-dimensional coordinates of each point on the surface identified as belonging to the surface of the sail are stored in a suitable format, for example IGES format or equivalent.

Figure 6:
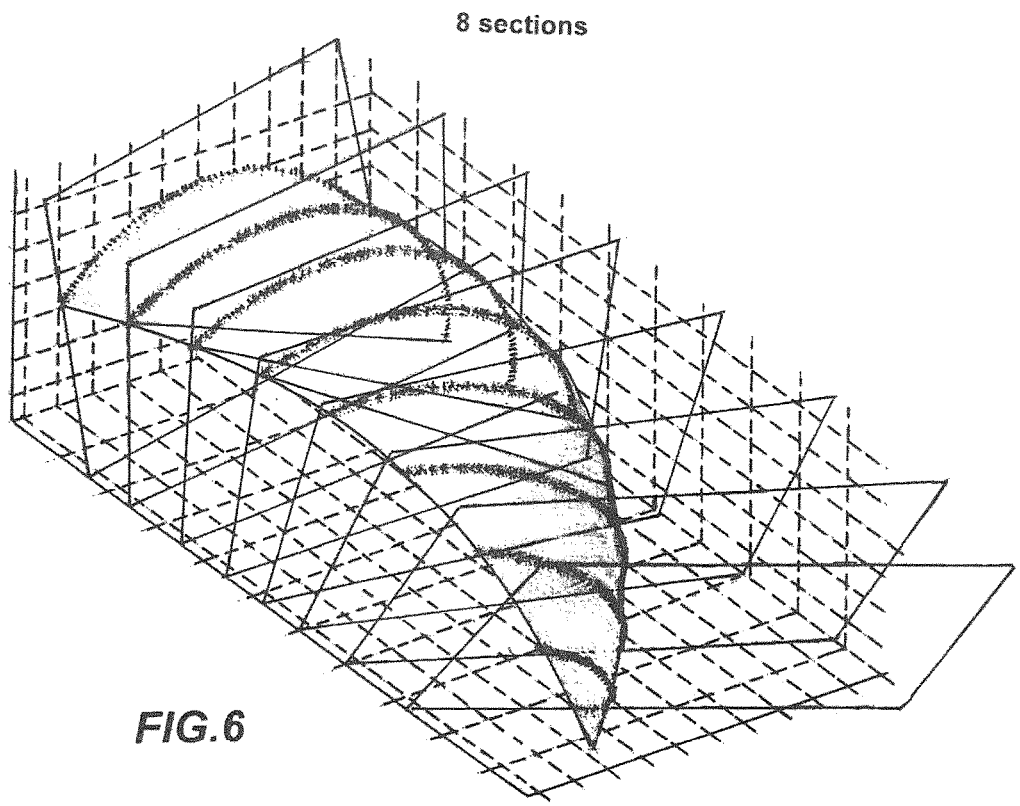
FIG. 6 is a schematic view of the processed transformation of the cloud of points of FIGS. 4 and 5 into sail surface.
Figure 7:
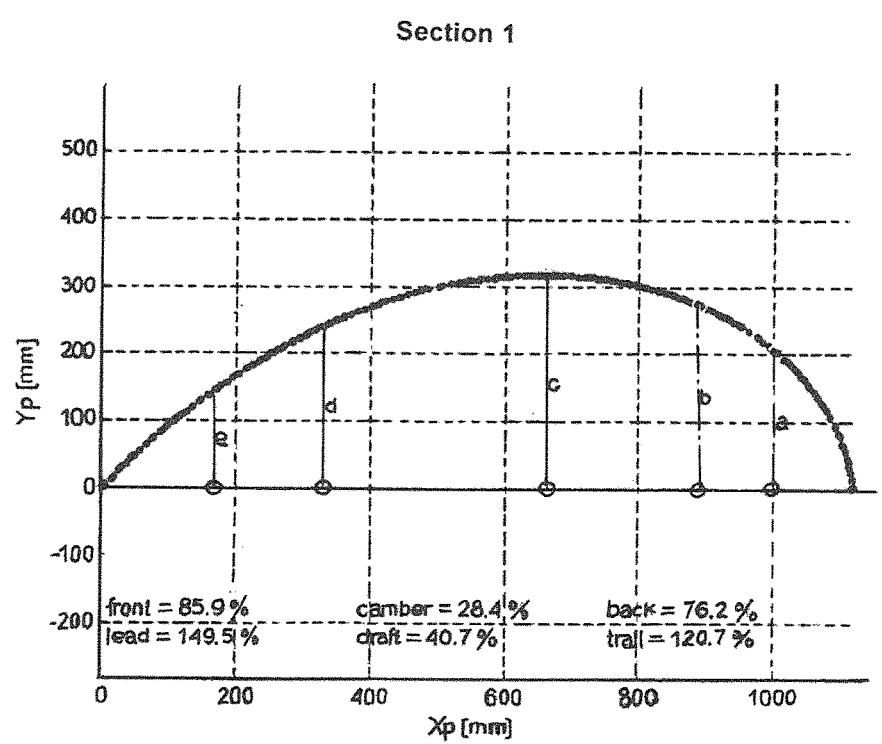
FIG. 7 is a graphical representation of a section of the sail representation of FIG. 6.

For defining the surface of the sail, a post-process program is used which automatically plots the angles and edges of the sail. Elimination criteria are applied to remove insignificant points from the cloud and, for each shape acquisition, a dimensional comparison of each side of the sail is performed by comparing the values measured for the base, luff and leech (or foot and drops) with the theoretical reference values for the same sail parts. The program automatically defines and plots a pre-established number (in the case under examination, eight) of sail sections at different heights of the sail (FIG. 6) and, for each section or stripe of the sail thus identified, performs an automatic analysis consistent with the standard analysis procedure adopted by the designer of the sail, typically supplying for each stripe the entry and exit angles, camber, sheet measurement, depth and location of draft, twist, etc. relative to the central axis of the boat (FIG. 7).

Figure 8:
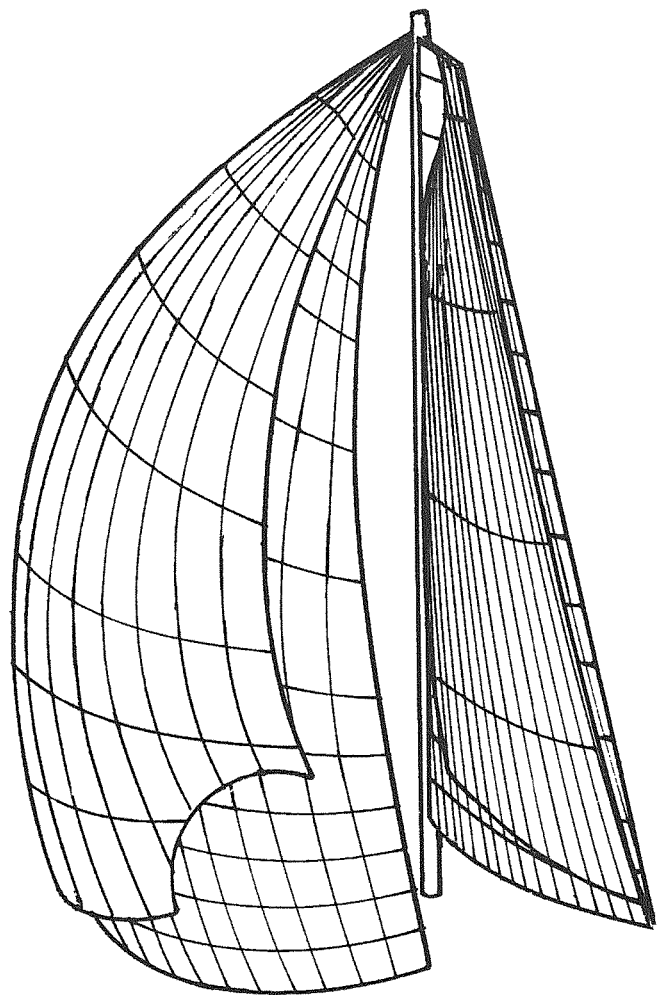
FIG. 8 is a three-dimensional image of comparison between the theoretical surface of the design modelling of the sail of the preceding figures and the actual shape detected on the said sail in real conditions of use by means of the device of the present invention.

It is also possible to compare, for example by superimposition of images, the "flying shape" with the "design shape" as illustrated in FIG. 8 in order to detect and display any discrepancy between the three-dimensional behaviour expected for the sail in question, based on the design data, and the real three-dimensional behaviour. This allows the sailmaker to refine the design of the sail, the designer of the hull and the rigging to take account of the real behaviour, and the sailor to act on the adjustments of the sail in order to influence its performance.

The invention claimed is:

1. A method for detecting the form of a sail, comprising detecting the form of the sail by a three-dimensional measurement of a plurality of locations of a surface of the sail, which measurement is carried out by measurement of a time-of-flight of an optical signal,
wherein the optical signal is used to generate a cloud of locations measured on the sail and the locations of the cloud of locations are then interpolated in order to generate a real surface of the sail during operation, and the real surface is compared with a theoretical design surface of the sail in order to adjust the sail via the comparison between the real surface and the theoretical design surface.

2. The method of claim 1, wherein the optical signal is generated and received by one or more 3D cameras.

3. The method of claim 2, wherein the one or more 3D cameras are time-of-flight cameras.

4. The method of claim 1, wherein the optical signal comprises a laser signal is received by means of a multi-echo time-of-flight (TOF) laser scanner.

5. The method of claim 4, wherein the laser scanner is oscillated about an axis perpendicular to an axis of a rotating mirror of the laser scanner through an angle such that the laser of the scanner progressively illuminates the entire surface of the sail.

6. The method of claim 4, wherein the laser signal is generated and received by a time-of-flight (TOF) laser scanner having 5 or more echoes.

7. The method of claim 4, wherein the TOF laser scanner is controlled by a computer program which controls a motorization unit.

8. The method of claim 6, wherein the laser scanner is oscillated about an axis perpendicular to an axis of a rotating mirror of the laser scanner through an angle such that the laser of the scanner progressively illuminates the entire surface of the sail.

9. The method of claim 7, wherein an angle of rotation about an axis (15) is adjusted according to the dimensions of the sail and a position of the TOF laser scanner, and is such as to illuminate the entire surface of the sail starting from an initial scanning position that is determined, for each acquisition of data, by a proximity transducer (25) mounted on a bracket (14), and the proximity transducer is sensitive to an angular position of the scanner.

10. The method of claim 7, wherein the motorization unit comprises a brushless motor.

11. The method of claim 1, wherein the optical signal is generated by: an optical time-of-flight detection device, or an optical time-of-flight detection device mounted on the plane of the deck of a sailing boat.

12. The method of claim 11, wherein the optical time-of-flight detection device comprises at least three or more 3D cameras, and the at least three or more 3D cameras comprise at least three or more time-of-flight camera which frames the vertexes of the sail.

13. The method of claim 11, wherein the optical time-of-flight detection device comprises one or more 3D cameras.

14. The method of claim 13, wherein the optical time-of-flight detection device comprises at least three time-of-flight cameras which can frame the volume comprised within the vertexes of the sail.

15. The method of claim 11, wherein either optical time-of-flight detection device comprises a time-of-flight laser scanner; and, a motorization unit of the laser scanner in order to rotate the laser scanner about an axis perpendicular to an axis of a rotating mirror of the laser scanner through an angle such that the laser of the laser scanner progressively illuminates the entire surface of the sail.

16. The method of claim 15, wherein the laser scanner is a multi-echo time-of-flight (TOF) scanner.

17. The method of claim 15, wherein the motorization unit comprises a controlled rotating actuator, or the motorization unit comprises a brushless gear motor.

18. The method of claim 17, wherein a computer program via a serial port controls the controlled rotating actuator.

19. The method of claim 18, wherein an acquisition or receiving of data is via a TCP/IP protocol and saved in a mass storage device of a computer, generating the cloud of locations (points) whose 3D coordinates are measured in a single absolute reference for each individual point, and the cloud of locations describes the three-dimensional shape of the sail in the conditions of use corresponding to the detection of the data, and this cloud is transformed into a three-dimensional surface by a computer program.

20. The method of claim 18, wherein acquisition or receiving of data from the laser scanner is managed via an Ethernet connection through a user interface of the laser scanner.

21. A method for detecting the form of a sail, comprising detecting the form of the sail by a three-dimensional measurement of a plurality of locations of a surface of the sail, which measurement is carried out by measurement of a time-of-flight of an optical signal, wherein the optical signal comprises a laser signal generated and received by means of a multi-echo time-of-flight (TOF) laser scanner, and the TOF laser scanner is controlled by a computer program which controls a motorization unit, and wherein an angle of rotation about an axis (15) is adjusted according to the dimensions of the sail and a position of the TOF laser scanner, and is such as to illuminate the entire surface of the sail over a time interval, starting from an initial scanning position that is determined, for each acquisition of data, by a proximity transducer (25) mounted on a bracket (14), and the proximity transducer is sensitive to an angular position of the scanner.

22. The method of claim 21, wherein the optical signal:
(a) is generated and received by one or more 3D cameras, or
(b) is generated and received by one or more time-of-flight cameras.

23. The method of claim 21, wherein the motorization unit comprises a brushless motor.

24. The method of claim 21, wherein the time interval is about a second.

* * * * *